May 13, 1969 U. TSAO 3,443,902
CHLORINE PURIFICATION
Filed Aug. 5, 1966

INVENTOR
Utah Tsao
BY Marn & Jangarathis
ATTORNEYS

United States Patent Office 3,443,902
Patented May 13, 1969

3,443,902
CHLORINE PURIFICATION
Utah Tsao, Jersey City, N.J., assignor to The Lummus Company, New York, N.Y., a corporation of Delaware
Filed Aug. 5, 1966, Ser. No. 570,544
Int. Cl. C01b 7/06; B01d 53/00
U.S. Cl. 23—219                   5 Claims

ABSTRACT OF THE DISCLOSURE

Process for more efficiently operating a wash zone for scrubbing gaseous chlorine with liquid chlorine from a chlorine liquefaction zone wherein gaseous chlorine from the wash zone is compressed and a portion thereof is passed in a heat transfer relationship with liquid chlorine retained in the wash zone after scrubbing the gaseous chlorine to condense the compressed gaseous chlorine. The condensed chlorine is passed to the wash zone to scrub the gaseous chlorine, thereby reducing liquefied chlorine requirements from the liquefaction zone.

---

This invention relates to the production of chlorine, and more particularly relates to a process for more efficiently removing undesired components from chlorine gas.

Chlorine gas produced by electrolysis of an aqueous brine solution contains entrained water, air, carbon dioxide, water vapor and various organic materials. In general, the chlorine gas is withdrawn from the electrolytic cells and passed to a wash zone for removal of entrained water. The chlorine gas withdrawn from the wash zone is scrubbed, in a wash tower, with liquid chlorine to remove water vapor and high boiling organic materials, compressed to an elevated pressure, passed to a liquefaction section and cooled therein to below the saturation temperature at the elevated pressure.

In general, the liquid chlorine utilized in the wash tower is supplied from the chlorine liquefaction section. This recycling of liquefied chlorine from the liquefaction section back to the wash tower increases refrigeration costs and lowers the overall plant production. Accordingly, it would be highly desirable to lower the rate of liquid chlorine recycle without significantly affecting the operation of the wash tower.

An object of this invention is to more efficiently operate a chlorine wash tower.

Another object of this invention is to lower refrigeration costs in a chlorine liquefaction section.

A further object of this invention is to increase the overall production in a chlorine synthesis process.

These and other objects will become more readily apparent from reading the following detailed description of the invention with reference to the accompanying drawings wherein like reference numerals designate like parts throughout and wherein.

Figure 1:
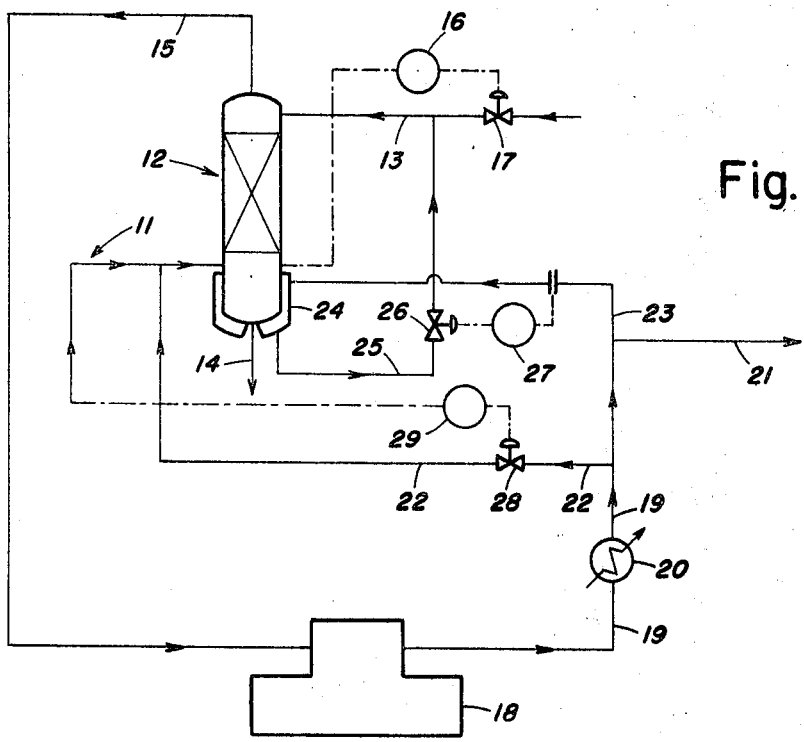
FIG. 1 is a schematic flow diagram of one embodiment of the invention.

Referring to FIG. 1, gaseous chlorine produced in an electrolytic cell after cooling and drying (not shown), containing a trace of solid salt and organic materials is introduced through line 11 into a wash tower 12, containing a suitable packing for increasing gas-liquid contact and countercurrently contacted therein with liquid chlorine introduced through line 13 from a chlorine liquefaction section (not shown). As a result of the contact between the gaseous chlorine and the cooler liquid chlorine, the gaseous chlorine is scrubbed of high boiling organic materials and solid salt, with a major portion of the liquid chlorine being vaporized and withdrawn through line 15 together with the gaseous chlorine introduced through line 19. A tower bottoms containing chlorine, organic material and salt is maintained in the tower 12 and intermittently withdrawn and passed through line 14 to a tank (not shown). The liquid chlorine in the tank (not shown) is gradually vaporized by ambient heat and returned to the tower 12, leaving the higher boiling component in the tank. The liquid level in the bottoms section of the tower 12 is maintained by a level controller 16 which opens and closes a valve 17 in line 13 in response to the level of liquid in the bottoms section of the tower 12.

The gaseous chlorine withdrawn from tower 12 through line 15 is introduced into a compressor 18 and compressed therein to a pressure suitable for the subsequent liquefaction of chlorine. Compressed gaseous chlorine is withdrawn from compressor 18 through line 19 and passed through a cooler 20. A major portion of the gaseous chlorine in line 19 is passed to a liquefaction section (not shown) through line 21. A first minor portion of the compressed gaseous chlorine in line 19 is passed from cooler 20 through line 22 and introduced into line 11 for maintaining pressure upstream of the tower 12 as hereinafter more fully described.

A second minor portion of the compressed gaseous chlorine in line 19 is passed from cooler 20 through line 23 into a jacket 24 which surrounds the lower portion of the tower 12. As a result of indirect heat transfer relationship with the liquid chlorine in the bottoms section of the tower 12, the gaseous chlorine introduced into the jacket 24 is condensed. The now liquefied chlorine is withdrawn from the jacket 24 through line 25 under the control of valve 26 and admixed with the liquid chlorine in line 13. The valve 26 in line 25 is operated by a suitable controller 27 responsive to the rate of flow of gaseous chlorine in line 23. The controller 27 in line 23 opens and closes the valve 26 in response to decreases and increases, respectively, in the flow rate of compressed gaseous chlorine passed from cooler 20 through line 23 thereby maintaining a set flow rate of liquefied chlorine through line 25 to line 13. As a result of the introduction of liquefied chlorine into line 13 through line 25, the amount of liquid chlorine introduced into tower 12 from the liquefaction section (not shown) is reduced, thereby decreasing the refrigeration cost per unit of final liquid chlorine product.

The pressure upstream of the tower 12, i.e., the pressure in the electrolytic cells (not shown), is maintained at a predetermined level by increasing or decreasing the rate of flow of compressed gaseous chlorine introduced into line 11 through line 22. Accordingly, there is provided in line 22 a valve 28 which is operated by a controller 29 responsive to the pressure upstream of the tower 12. In operation, if the controller 29 senses a pressure upstream of the tower 12 above a predetermined value, the valve 28 is partially closed, decreasing the flow rate of compressed chlorine into line 11 through line 22 thereby decreasing the pressure upstream of the tower 12. If the controller 29 senses a pressure below the predetermined value, valve 28 is opened further, increasing the flow rate into line 11 through line 22 thereby increasing the pressure upstream of the tower 12.

Figure 2:
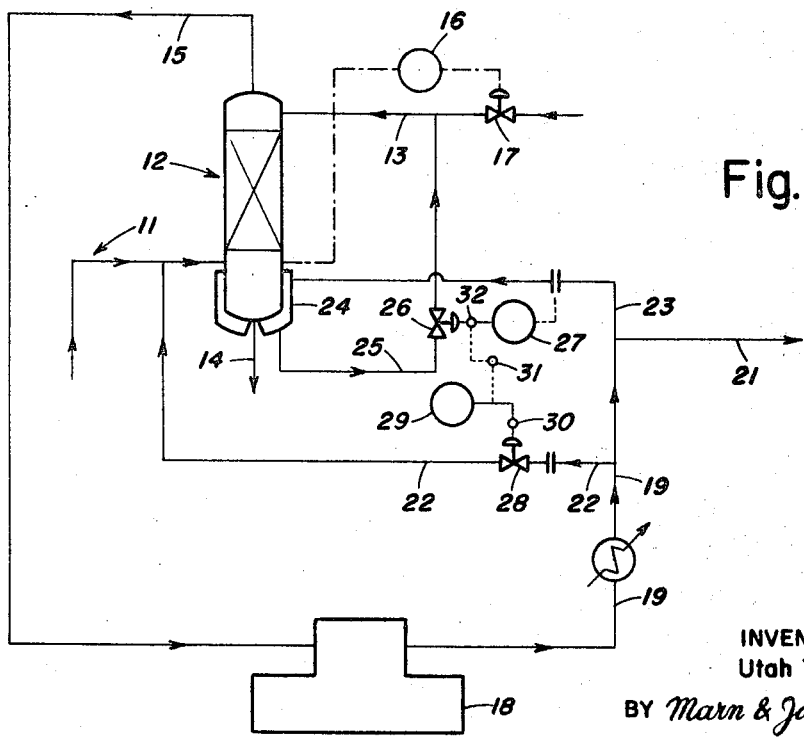
FIG. 2 is a schematic flow diagram of another embodiment of the invention.

In another embodiment, illustrated in FIG. 2, there is provided a wash tower 12 including a jacket 24 surrounding the bottoms section, a compressor 18, and recycle lines 22 and 23, which function as FIG. 1. In this embodiment, however, the valve 26 in line 25 and the valve 28 in line 22 are linked together by amplifiers 30 and 31 and an override relay 32. The amplifiers 30 and 31 permit sequential operation of the valves 26 and 28 and the override relay 32 permits pressure controller 29 to take over the operations of valve 26.

In operation, when the valve 28, in response to pressure controller 29, is closed to a predetermined minimum position, the amplifiers 30 and 31 and the override relay 32 operate to permit valve 26 to be operated in response to the pressure controller 29 instead of the flow controller 27. The valve 28 remains at the predetermined minimum and valve 26 opens and closes in response to the pressure controller 29. The pressure upstream of the tower 12 is now controlled by the flow of liquid chlorine through line 25 to line 13. When the function of pressure controller 29 is switched from operating valve 28 to operating valve 26, the flow in line 25 will fluctuate momentarily and the controller 16 will partially compensate for such fluctuation.

It should be readily apparent that the switching of the functions of controllers 27 and 29 from the one illustrated in FIG. 1 to the one illustrated in FIG. 2 controls the pressure upstream of the tower 12 without requiring a high rate of flow of compressed chlorine gas through line 22 thereby increasing the overall production of the plant.

The following operating conditions are illustrative of the invention but the scope of the invention is not to be limited thereby.

TABLE I.—FIG. 1

| Line | Flow rate (lb./hr.) | Temperature (° F.) | Pressure (p.s.i.a.) |
|---|---|---|---|
| 11 | 13,026 | 100 | 13.5 |
| 13 | 3,022 | −35 | 12.8 |
| 14 | ¹ 30 | −22 | 13.5 |
| 15 | 17,342 | −35 | 12.7 |
| 19 | 17,342 | 100 | 61.7 |
| 21 | 15,042 | 100 | 61.7 |
| 22 | 1,300 | 100 | 61.7 |
| 23 | 1,000 | 100 | 61.7 |
| 25 | 1,000 | 40 | 61.7 |

See footnote, Table II.

TABLE II.—FIG. 2

| Line | Flow rate (lb./hr.) | Temperature (° F.) | Pressure (p.s.i.a.) |
|---|---|---|---|
| 11 | 14,026 | 100 | 13.5 |
| 13 | 3,022 | −35 | 12.8 |
| 14 | ¹ 30 | −22 | 13.5 |
| 15 | 17,342 | −35 | 12.7 |
| 19 | 17,342 | 100 | 61.7 |
| 21 | 16,042 | 100 | 61.7 |
| 22 | 300 | 100 | 61.7 |
| 23 | 1,000 | 100 | 61.7 |
| 25 | 1,000 | 40 | 61.7 |

¹ Average 30 lb./hr. of liquid chlorine are withdrawn through line 14 and about 24 lb./hr. of vaporized chlorine are returned to the bottoms of tower 12 from a tank (not shown).

The above process is extremely effective for both decreasing the refrigeration costs of the plant and increasing production. The refrigeration load of the chlorine liquefaction section of the plant can be decreased as much as about 6.7% by operating in accordance with the process of the invention.

While preferred embodiments of the present invention have been shown and described, it is understood that the same is not limited thereto, but is susceptible of changes and modifications within the spirit and scope of the invention, and it is therefore intended to cover all such changes and modifications as are encompassed by the scope of the intended claims.

What is claimed is:

1. In the production of liquid chlorine wherein gaseous chlorine from a chlorine production zone is introduced into and scrubbed in a wash zone by contact with liquid chlorine introduced into said wash zone from a chlorine liquefaction zone, a method for more efficiently operating the wash zone comprising:
    (a) compressing gaseous chlorine removed from the wash zone;
    (b) passing a portion of the compressed gaseous chlorine to the chlorine liquefaction zone;
    (c) passing another portion of the compressed gaseous chlorine in heat transfer relationship with liquid chlorine retained in the wash zone after contacting the gaseous chlorine to condense the compressed gaseous chlorine; and
    (d) passing the condensed chlorine to the wash zone to scrub the gaseous chlorine, thereby reducing the amount of liquid chlorine required to be passed to the wash zone from the chlorine liquefaction zone.

2. The method of claim 1 wherein the condensed chlorine passed to the wash zone is mixed with the liquid chlorine, said mixing being effected prior to the introduction of the liquid chlorine into the wash zone.

3. The method of claim 1 and further comprising mixing a further portion of the compressed gaseous chlorine with the gaseous chlorine to be introduced into the wash zone, and increasing and decreasing the amount of the further portion of the compressed gaseous chlorine in response to decreases and increases, respectively, in pressure in the chlorine production zone to maintain the pressure in the chlorine production zone at a predetermined level.

4. The method of claim 3 and further comprising stopping pressure control of the flow of said further portion when said flow is at a predetermined minimum and controlling the amount of condensed chlorine passed to the wash zone in response to increases and decreases in pressure in the chlorine production zone to maintain the pressure in the chlorine production zone at said predetermined level.

5. The method of claim 1 and further comprising cooling the compressed gaseous chlorine prior to step (b).

References Cited

UNITED STATES PATENTS

| | | | |
|---|---|---|---|
| 1,913,628 | 6/1933 | Falkenburg | 62—9 |
| 2,318,512 | 12/1940 | McHaffie | 23—219 |
| 2,547,928 | 4/1951 | Davis et al. | 23—219 |
| 2,700,431 | 1/1955 | Sutter | 23—219 |
| 2,822,889 | 2/1958 | Sutter | 23—219 |
| 3,230,724 | 1/1966 | Havas | 62—11 |

FOREIGN PATENTS 934,394    8/1963    Great Britain.

OSCAR R. VERTIZ, *Primary Examiner.*

G. O. PETERS, *Assistant Examiner.*

U.S. Cl. X.R.

55—71